United States Patent [19]

Sakamoto et al.

[11] Patent Number: 5,006,770
[45] Date of Patent: Apr. 9, 1991

[54] SERVOMOTOR VELOCITY CONTROL APPARATUS

[75] Inventors: Keiji Sakamoto, Hachioji; Hironobu Kuwano, Oshino, both of Japan

[73] Assignee: Fanuc Ltd, Minamitsuru, Japan

[21] Appl. No.: 290,290

[22] PCT Filed: Apr. 25, 1988

[86] PCT No.: PCT/JP88/00402

§ 371 Date: Dec. 9, 1988

§ 102(e) Date: Dec. 9, 1988

[87] PCT Pub. No.: WO88/08640

PCT Pub. Date: Nov. 3, 1988

[30] Foreign Application Priority Data

Apr. 30, 1987 [JP] Japan .................. 62-107252

[51] Int. Cl.$^5$ .................................................. G05B 13/00
[52] U.S. Cl. .................................. 318/561; 318/615; 318/616; 318/618
[58] Field of Search ............... 388/805, 814, 820, 900, 388/902, 906, 930; 318/560–640, 430–434

[56] References Cited

U.S. PATENT DOCUMENTS

| | | | |
|---|---|---|---|
| 3,424,966 | 1/1969 | Webb | 388/814 |
| 3,569,808 | 11/1971 | Goto | 388/220 |
| 3,772,580 | 11/1973 | Odone | 388/814 |
| 3,870,937 | 3/1975 | Ban | 388/814 |
| 4,540,923 | 9/1985 | Kade et al. | 318/561 |
| 4,554,964 | 11/1985 | Awano et al. | 388/814 X |
| 4,556,830 | 12/1985 | Schwalm et al. | 318/434 |
| 4,680,518 | 7/1987 | Kurakake et al. | 318/433 X |
| 4,684,856 | 8/1987 | Kahkipuro | 388/820 |
| 4,695,780 | 9/1987 | Kurakake et al. | 318/615 X |
| 4,727,303 | 2/1988 | Morse et al. | 318/616 |
| 4,733,149 | 3/1988 | Culberson | 318/561 |
| 4,816,734 | 3/1989 | Kurakake et al. | 318/615 |
| 4,831,317 | 5/1989 | Sakamoto et al. | 318/599 |
| 4,851,754 | 7/1989 | Sakamoto et al. | 318/616 |

FOREIGN PATENT DOCUMENTS 0208788 8/1987 European Pat. Off. .
2802224 7/1979 Fed. Rep. of Germany .

Primary Examiner—Paul Ip
Attorney, Agent, or Firm—Staas & Halsey

[57] ABSTRACT

A servomotor velocity control apparatus constructs a digital servo system including a compensating circuit (2) having a variable gain. The integration gain of the compensating circuit (2) is set and controlled by a gain setting unit (5) so as to be inversely proportional to estimated servomotor velocity computed from a velocity signal fed back in discrete fashion. It is possible to perform high-speed positioning based on an actual velocity signal which prevails when velocity is low.

5 Claims, 1 Drawing Sheet

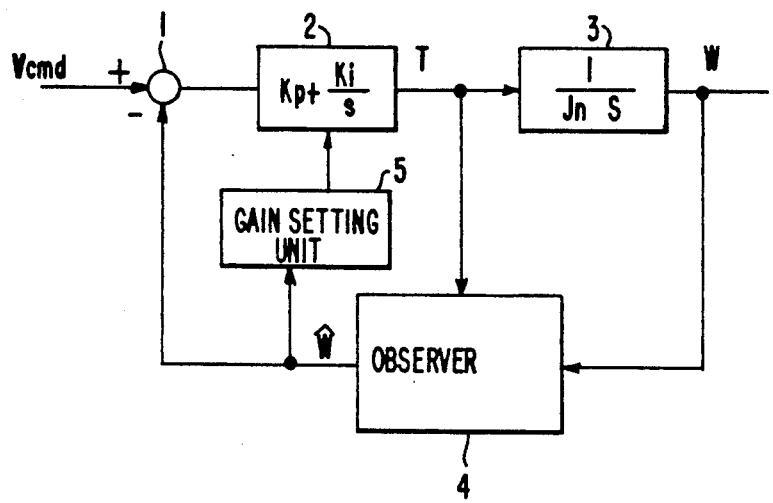
FIG. I
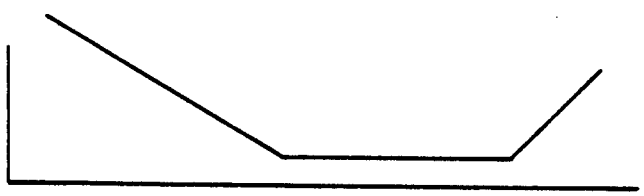
FIG.2(a) MOTOR VELOCITY
FIG.2(b) ACTUAL VELOCITY SIGNAL W
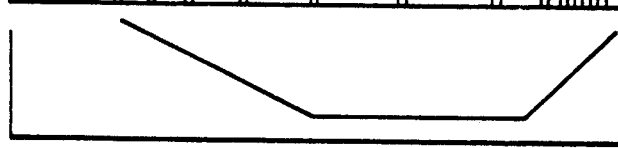
FIG.2(c) ESTIMATED VELOCITY ⇧
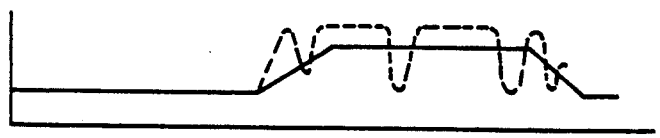
FIG.2(d) INTEGRATION GAIN Ki

SERVOMOTOR VELOCITY CONTROL APPARATUS

BACKGROUND OF THE INVENTION

1. Technical Field

This invention relates to a servomotor velocity control apparatus forming a digital servo system, the gain of which is capable of being varied.

2. Background Art

In an ordinary digital servo system, the torque command of a servomotor is set based on an error signal between a commanded velocity and an actual velocity, and a pulse coder generally is used as velocity detecting means for detecting the actual velocity.

To accurately control the velocity and position of the servomotor based on the error signal, a PI compensating circuit is usually required for performing a proportional operation and an integrating operation. In order to minimize the influence of frictional resistance in a servo system which includes such a compensating circuit, consideration has been given to altering the proportional gain and integration gain of the compensating circuit in dependence upon the velocity of the servomotor.

With this conventional servo system, it becomes necessary to suitably alter the integration gain when it is attempted to maintain positional accuracy by removing the influence of external disturbances. However, when the motor is operating at a low velocity, stabilized operation of the feedback system is lost. The reason for this is that the actual velocity signal from the velocity detecting means such as the pulse coder is fed back in discrete fashion; hence, velocity detection resolution declines at low rotational speeds.

More specifically, when the resolution of detected velocity declines, an offset due to static frictional resistance develops in the servo system when it is operating at very low velocity. Consequently, even if an attempt is made to raise positioning accuracy by changing the integration gain based on the actual velocity signal fed back from the pulse coder, the gain cannot be altered by making a proper evaluation of the amount of offset. An irregularity develops in the rotational velocity of the servomotor as a result.

SUMMARY OF THE INVENTION

The present invention has been devised in view of the foregoing problem and its object is to provide a servomotor velocity control apparatus in which high-speed positioning is made possible, based on an actual velocity signal fed back in discrete fashion, by means of a velocity feedback loop provided with a PI compensating circuit in which the integration gain of a digital servo system can be varied.

According to the present invention, there is provided a servomotor velocity control apparatus comprising arithmetic means for computing an error between actual velocity discretely detected from a servomotor and commanded velocity, compensating means, which has a control gain that includes a variable integration gain, for forming a torque command for the servomotor based on an error output from the arithmetic means, and control means for setting and controlling the integration gain of the compensating means in such a manner that the integration gain becomes inversely proportional to an estimated velocity of the servomotor, velocity of the servomotor being controlled by a discrete velocity command signal.

In accordance with the servomotor velocity control apparatus of the present invention, the estimated velocity of the servomotor is computed from a velocity signal fed back in a discrete manner, and an integration gain is obtained that is inversely proportional to the estimated velocity. As a result, the resolution of the velocity signal at low velocity is effectively improved, thereby making it possible to vary the integration gain of the digital servo system and achieve high-speed positioning from the actual velocity signal fed back discretely by the velocity feedback loop provided with the PI compensating circuit.

BRIEF DESCRIPTION OF THE DRAWINGS

FIG. 1 is a block diagram of an embodiment of the present invention, and FIG. 2 is a timing diagram for describing the operation of the embodiment of FIG. 1.

DETAILED DESCRIPTION OF THE PREFERRED EMBODIMENT

An embodiment of the present invention will now be described in detail with reference to the drawings.

FIG. 1 is a block diagram of a velocity control apparatus embodying the present invention. The velocity control apparatus includes a compensating circuit 2, which has a predetermined control gain, supplied with a velocity command Vcmd via an adder circuit 1. The compensating circuit 2 converts the velocity command Vcmd into a torque command T for a servomotor 3. The latter is driven and controlled by the torque command T in accordance with the commanded velocity Vcmd.

An estimated velocity W, which is obtained by estimating the actual velocity of the servomotor 3, is fed back to the adder circuit 1, which computes an error between this feedback and the velocity command Vcmd. The error is outputted to the compensating circuit 2 as a velocity error.

The compensating circuit 2 is for setting the power of the servomotor 3, such as a predetermined driving current, based on the velocity error. The control gain G of the compensating circuit is set as follows:

$$G = K_p + K_i/s$$

where $K_p$ and $K_i$ represent proportional gain and integration gain, respectively. The characterizing feature of the velocity control apparatus of the invention resides in the fact that the integration gain $K_i$ is variable, as will be set forth below, in dependence upon the estimated velocity W.

Specifically, the velocity control apparatus is such that an actual velocity signal W from the servomotor 3 is inputted as a pulse signal, the frequency of which is proportional to velocity, formed discretely by velocity detecting means such as a pulse coder. Since the servomotor 3 ordinarily rotates at a high velocity, the velocity detection range of the velocity detecting means is set to be large. As a consequence, velocity resolution at low velocity declines in relative terms. Accordingly, in a case where the actual velocity signal W from the servomotor 3 is obtained from a pulse coder or the like, an observer 4 is provided for computing the estimated velocity W from the actual velocity W and the torque command T, and the integration gain $K_i$ of the compensating circuit 2 is set so as to be inversely proportional to the estimated velocity W. Numeral 5 denotes a gain setting unit adapted to set the integration gain Ki to zero when the estimated velocity W is above a certain value, and to increase the integration gain Ki so as to be inversely proportional to the estimated velocity W when the velocity of the servomotor 3 decreases to cause a certain amount of decline in the velocity resolution of the pulse coder.

In the above-described arrangement, the velocity signal fed back to the adder circuit 1 also is the estimated velocity W from the observer 4. However, the estimated velocity W need not necessarily be used in the error computation. The reason is that it will suffice to adopt an arrangement in which the actual velocity signal W from the servomotor 3 is fed back to the adder circuit 1.

When positioning is performed at high speed by performing PI control in accordance with the velocity command Vcmd in the servomotor velocity control apparatus thus constructed, the estimated velocity W of the servomotor 3 is computed from the discretely fed back actual velocity signal W, and the integration gain of the compensating circuit 2 can be changed so as to be inversely proportional to the estimated velocity.

FIG. 2 illustrates the relationship between motor velocity ((a) in FIG. 2) and the variable integration gain Ki FIG. 2(b) shows the manner in which velocity resolution declines when the actual velocity signal W from the velocity detecting means such as a pulse coder is indicative of a low velocity.

FIG. 2(c) illustrates the velocity W of the servomotor 3 estimated by the observer 4. By estimating velocity in a continuous manner, the integration gain Ki of the compensating circuit 2 can be varied in inverse proportion to the estimated velocity W via the gain setting unit 5 when the velocity resolution of the pulse coder deteriorates to a certain degree ((d) in FIG. 2).

Specifically, in FIG. 2(d) the broken line indicates the oscillation of Ki caused when the integration gain Ki is varied in PI control in correspondence with the actual velocity signal W when the latter is indicative of a low velocity. By contrast, with the above-described embodiment, the integration gain Ki altered in accordance with the estimated velocity W from the observer 4, as indicated by the solid line, in effect improves the resolution of the velocity signal fed back at low velocity.

With regard to variably setting the integration gain Ki by the gain setting unit 5, it is preferred that the gain be altered continuously with respect to the estimated velocity W. However, this can be performed in discrete fashion within practical limits.

Though an embodiment of the present invention has been described, the invention is not limited thereto and can be modified in a variety of ways without departing from the scope of the claims.

The servomotor velocity control apparatus of the present invention computes the estimated velocity of a servomotor from a velocity signal fed back in discrete fashion, and alters integration gain so as to be inversely proportional to the estimated velocity, thereby in effect raising the resolution of the velocity signal at the time of low velocity.

What is claimed is:

1. A servomotor velocity control apparatus for controlling the velocity of a servomotor by a discrete velocity command signal, the apparatus having a limitation on a fixed resolution with regard to discrete detection of actual velocity, comprising:

arithmetic means for computing an error between an estimated velocity of the servomotor and a commanded velocity corresponding to the discrete velocity command signal;

compensating means, which has a control gain that includes a proportional gain and a variable integration gain, for forming a torque command for the servomotor based on the error output from said arithmetic means; and control means for setting and controlling the integration gain of said compensating means so that the integration gain becomes inversely proportional to the estimated velocity of the servomotor which is based on the discretely detected actual velocity and the torque command.

2. A servomotor velocity control apparatus according to claim 1, further comprising an observer for computing the estimated velocity based on the actual velocity signal and the torque command.

3. A servomotor velocity control apparatus according to claim 1, wherein said compensating means comprises a proportional integrating circuit in which the integration gain becomes zero when the estimated velocity is greater than a predetermined value, and in which the integration gain is set and controlled so as to be inversely proportional to the estimated velocity only when velocity of the servomotor is below the predetermined value.

4. A servomotor velocity control apparatus according to claim 1, wherein the integration gain of said compensating means is set and controlled continuously by said control means.

5. A servomotor velocity control apparatus according to claim 1, wherein said arithmetic means, said compensating means and said control means are arranged as to computer system which processes digital signals.

* * * * *

UNITED STATES PATENT AND TRADEMARK OFFICE
CERTIFICATE OF CORRECTION

PATENT NO. : 5,006,770
DATED : APRIL 9, 1991
INVENTOR(S) : KEIJI SAKAMOTO ET AL.

It is certified that error appears in the above-identified patent and that said Letters Patent is hereby corrected as shown below:

Col. 2, line 35, "W" should be --$\hat{W}$--.

Col. 3, lines 1, 3, 5, 11, 12, 20, 31, 35, 44 and 50, "W" should be --$\hat{W}$--;

line 27, "Ki FIG.2(b)" should be --Ki.  FIG. 2(b)--.

Col. 4, line 43, after "when" insert --the--;

line 52, change "to" to --a--.

Col. 2, lines 53 and 66, "W" should be --$\hat{W}$--.

Signed and Sealed this

Fifteenth Day of September, 1992

Attest:

DOUGLAS B. COMER

Attesting Officer    Acting Commissioner of Patents and Trademarks